Figure 1:
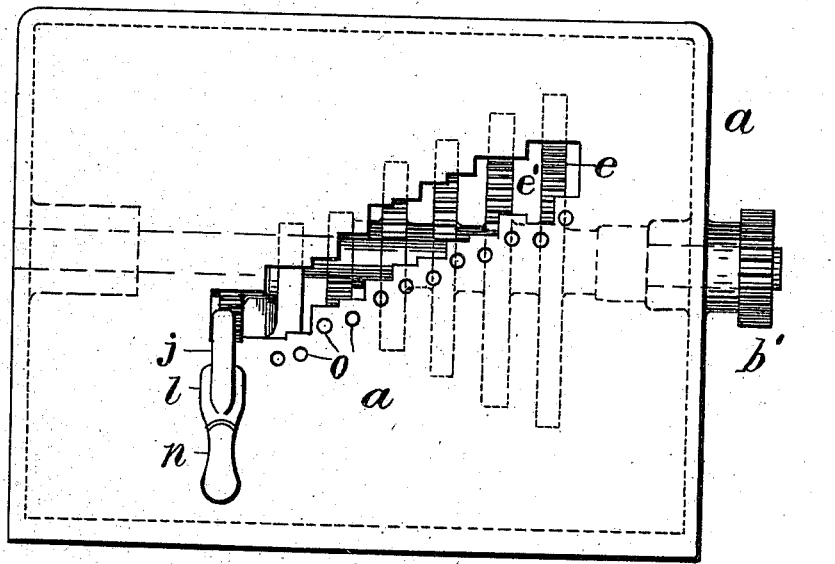

No. 723,255. PATENTED MAR. 24, 1903.
F. L. & H. J. EBERHARDT.
MECHANICAL MOVEMENT.
APPLICATION FILED JUNE 14, 1902.
NO MODEL.
2 SHEETS—SHEET 1.

Attest:
L. Lee.
C. T. Heaton.

Inventors.
Fred L. Eberhardt,
Henry J. Eberhardt,
per Thomas S. Crane, Atty.

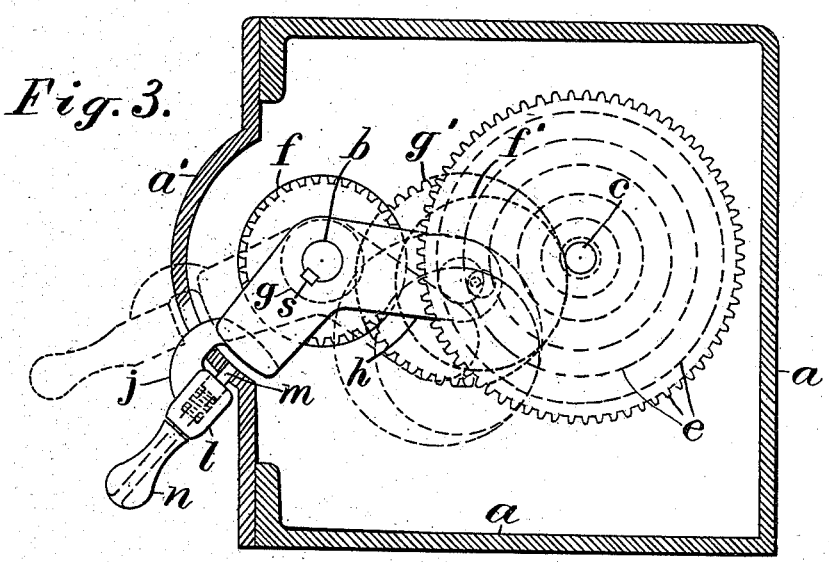
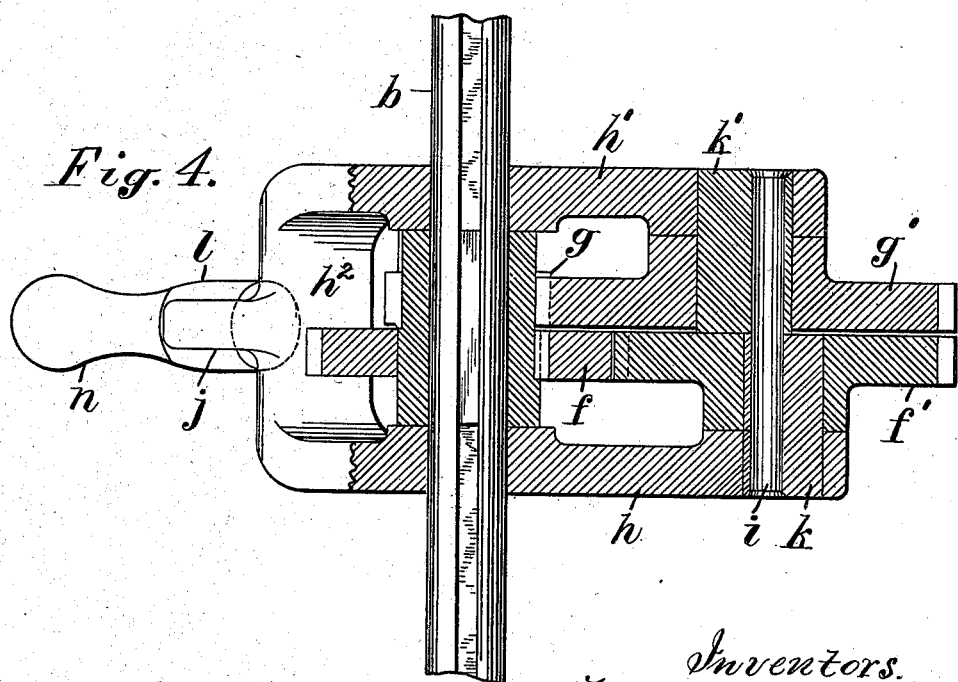

UNITED STATES PATENT OFFICE.

FRED L. EBERHARDT AND HENRY J. EBERHARDT, OF NEWARK, NEW JERSEY, ASSIGNORS TO GOULD & EBERHARDT, OF NEWARK, NEW JERSEY, A CORPORATION OF NEW JERSEY.

MECHANICAL MOVEMENT.

SPECIFICATION forming part of Letters Patent No. 723,255, dated March 24, 1903.

Application filed June 14, 1902. Serial No. 111,652. (No model.)

*To all whom it may concern:*

Be it known that we, FRED L. EBERHARDT, residing at No. 17 Hillside avenue, and HENRY J. EBERHARDT, residing at No. 113 Orchard street, Newark, county of Essex, State of New Jersey, citizens of the United States, have invented certain new and useful Improvements in Mechanical Movements, fully described and represented in the following specification and the accompanying drawings, forming a part of the same.

This invention relates to that class of speed-gearing in which a gear movable upon a rotary shaft is connected by an adjustable arm and intermediate gear with any one of a series of graded gears upon an adjacent parallel shaft; and the object of the invention is to furnish a greater range of speeds than heretofore with a given number of gear-wheels and to simplify the shifting and locking mechanism for the intermediate or transmitting wheels.

In the present invention two gear-wheels of different sizes are fitted movably upon a splined rotary shaft in connection with a single adjusting-arm projected at one side only of said shaft and having two independent or individual intermediates which mesh, respectively, into such gears with their outer ends set nearly coincident, and the usual means is provided for holding the arm in various positions to adjust either of the intermediates so as to mesh with any of the series of graded gears. One of the movable gears upon the rotary shaft is made considerably larger than the other, and the intermediates are correspondingly varied in size and are pivoted upon the arm so that their outer edges are approximately even or flush with one another to fit closely when required against the edge of a very small graded gear. One of the intermediates transmits a materially higher rate of speed than the other and may be called the "high-speed" intermediate, while the other may be called the "low-speed" intermediate.

Either the rotary shaft carrying the movable gears or the shaft carrying the series of graded gears may be used as the driver, and in such case a uniform speed of either shaft imparts the desired selective speed to the other shaft.

For convenience in describing the invention the shaft carrying the movable gears will be termed the "rotary" shaft and the shaft carrying the graded gears will be termed the "driven" shaft. The latter is shown in the drawings attached to a screw, as would be the case if employed to feed the carriage of a lathe or milling-machine; but the particular application of the variable speed is entirely immaterial to this invention.

Figure 2:
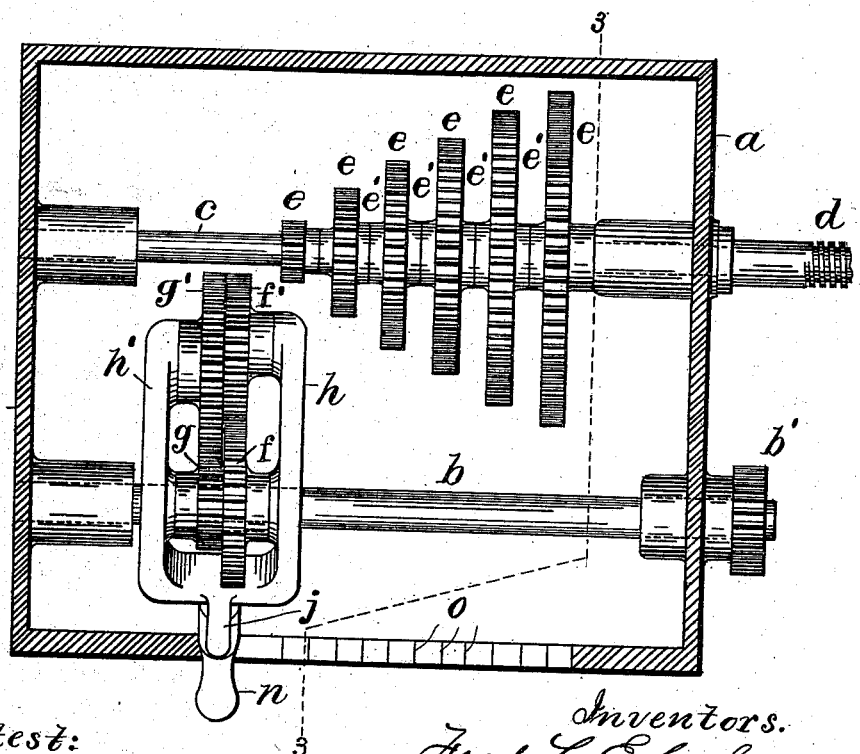

In the annexed drawings, Figure 1 is a front view of a box or casing containing the speed-gearing. Fig. 2 is a plan of the same with the top removed to show the arrangement of the gearing. Fig. 3 is a section on line 3 3 in Fig. 2, and Fig. 4 is a section of the adjusting-arm upon a plane through the axes of the gear-wheels. Fig. 4 is drawn upon a larger scale than the other figures.

A casing $a$ is shown, having bearings for the splined rotary shaft $b$ and for the driven shaft $c$, connected at one end with a feed-screw $d$. A graded series of spur-gears $e$ is shown secured upon the shaft $c$ to rotate therewith. Two gear-wheels $f$ and $g$ are shown fitted with a key $s$ to the splined shaft $b$, which has a key-seat extended between its bearings to fit the key. The forks $h\ h'$ of an adjusting-arm embrace the shaft at opposite sides of such gear-wheels.

The gear $f$ is shown twice the size of the gear $g$, and separate intermediate spur-wheels $f'$ and $g'$ are pivoted, respectively, upon the forks $h$ and $h'$ of the adjusting-arm to mesh with the gears $f$ and $g$, and the intermediates are so proportioned that their outer edges are substantially coincident, as shown in Fig. 3. The swinging of the adjusting-arm upon the splined shaft permits the adjustment of either of the intermediates into contact with the edge of one of the graded gears $e$, and spaces $e'$ are formed between such graded gears upon the shaft $c$ to clear the other intermediate when either is engaged with one of the graded gears.

By making the outer edges of the intermediate gears coincident they may be not only fitted more readily to the various gears $e$, but much smaller graded gears may be used in the series than where one intermediate projects beyond the edge of the other. To make the outer edges of the intermediates coincident when the intermediates are of such diverse sizes, they are mounted upon separate studs $k$ and $k'$, fastened in the arms $h$ and $h'$. Such studs are eccentric to one another, and to form a rigid construction a rivet $i$ is extended through them both, which holds them firmly in their longitudinal positions.

The cover of the casing is formed with an arched guide $a'$, having a slot formed by a series of notches adapted to guide a hand-lever projected from the adjusting-arm. The base $h^2$ of the forks which form the adjusting-arm is provided with a lever $j$, carrying a socket $l$, through which a spring-bolt $m$ is inserted, and provided at its outer end with a hand-piece $n$. The series of notches $o$ in the guide $a'$ are so located longitudinally of the shaft $b$ and so extended above or below the line of the shaft that they guide the lever of the shifting arm into the various positions required to set each of the intermediates in turn in contact with the graded gears.

Six graded gears are shown upon the shaft $c$, and two of the notches $o$ are shown in the guide $a'$ to set the adjusting-arm in two positions relative to each of such graded gears. The high-speed intermediate and the low-speed intermediate may thus both be separately engaged with each of the graded gears, and twelve variations of speed may be obtained by the use of the six graded gears, and any of such speed variations may be instantly secured by manipulating a single lever, which sets the adjusting-arm in the required position. The raising of the handpiece $n$ throws the inner end of the adjusting-arm downward and enables the intermediates to engage the larger gears $e$.

In Figs. 1, 2, and 3 the handpiece is shown in its lowest position in a notch adapted to hold the intermediates entirely clear from the graded gears, so that the rotation of one shaft imparts no movement to the other; but the adjusting-arm may be shifted laterally upon the shaft $b$ by raising the handpiece and moving it to any of the notches. Such raising of the handpiece $n$ is indicated by dotted lines in Fig. 3, with a corresponding depression of the adjusting-arm to bring the intermediate $g'$ adjacent to one of the graded gears. The intersection of its periphery with such graded gear is indicated by the dotted circles in Fig. 3, and the proximity of the other intermediate $f'$ is indicated by the smaller dotted circle adjacent thereto.

The centers of the gears $f'$ and $g'$ are so located that their peripheries coincide at their extreme outer edges, as at such point they extend farthest from the shaft $b$, and are thus best adapted to mesh with the smallest gears upon the shaft $c$. The coincidence of the two gears at such point enables either of them to mesh with a gear having teeth close to the shaft, as neither projects beyond the other, so as to cause interference with the shaft.

The coincidence of the two intermediate gears at the points where both can engage with the same driven gear thus permits a wider diversity in the proportions of the gears at the ends of the graded series and affords a greater variation of speed than could be secured if one intermediate projected beyond the other.

As stated above, it is immaterial which of the shafts $b$ or $c$ is employed as the driver; but the reversal of such driving arrangement also inverts the relation of the intermediate and its connected gear $f$ or $g$, and thus produces a reversal in the effect of the intermediate. The intermediate which operates to transmit the high speed when the shaft $b$ is the driver therefore transmits the lower speed when the shaft $c$ becomes the driver.

The gear-wheels $e$ in the graded series are shown with hubs for attachment to the shaft $c$ and have been described as thus attached; but the invention does not require the attachment of these gears to the shaft, as any means of transmitting the movement from such graded gears to a rotative part would perform all the functions of the invention. It is therefore immaterial whether the graded gears be connected together by attachment to a rotatable shaft or by attachment to a sleeve rotatable upon a fixed spindle, as the essential part of the invention is the connection of the graded gears together, so that the motion of any of them may be transmitted to a common object. It is therefore immaterial whether the movement of the graded gears be transmitted to the desired part by the shaft $c$ or by any other suitable means.

The speed-gearing described may be used for a great variety of purposes, and therefore constitutes a species of mechanical movement.

The screw $d$, which is connected with the shaft $c$, merely illustrates one application of the mechanism, in which it operates to transmit a selective speed to a feed-screw from a uniform rotating driving-shaft $b$; but this mechanical movement can be used to vary the speed of a cutting or drilling spindle or of any rotary part which requires an adjustable or variable speed.

We are aware that a double-armed tumbler has been used to support at its opposite ends intermediates connected with gears of diverse sizes movable upon a rotary shaft; but in our invention a tumbler with one arm only is used, and the intermediates are placed side by side at the same side of the rotary shaft, and where a very small gear is used at one end of the cone of graded gears the intermediates are mounted eccentrically side by side, so that their outer edges are flush with one another. By this construction either of the intermediates may be engaged with a gear very little larger than the shaft which carries the graded gears.

Having thus forth the nature of the invention, what is claimed herein is—

1. A mechanical movement comprising the rotary splined shaft $b$ and the adjacent graded series of gears $e$, gears of diverse sizes fitted side by side movably upon the splined shaft, an adjusting-arm fitted to the splined shaft to slide such gears longitudinally thereon, and having two intermediates pivoted upon the same end of the arm side by side and meshing respectively with such gears, and all of such intermediates adapted to mesh with any of the graded gears by a suitable adjustment of the arm.

2. A mechanical movement comprising the rotary splined shaft and the adjacent graded series of gears, two gears of diverse sizes fitted movably upon the splined shaft, an adjusting-arm movable upon the shaft, two intermediates pivoted upon the same end of the arm, side by side eccentrically to one another and meshing with such gears, and either of such intermediates adapted to mesh with any of the graded gears by a suitable adjustment of the arm.

3. A mechanical movement comprising the rotary splined shaft and the adjacent graded series of gears, two gears of diverse sizes fitted movably upon the splined shaft, an adjusting-arm movable upon the shaft, two intermediates meshing with such gears and pivoted upon the same end of the arm, side by side eccentrically to one another with their outer edges substantially coincident, and either of such intermediates adapted to mesh with any of the graded gears by a suitable adjustment of the arm.

4. A mechanical movement comprising the rotary splined shaft and the adjacent driven shaft having thereon a graded series of gears, one of such gears being projected slightly from the surface of such shaft, two gears of diverse sizes fitted movably upon the splined shaft, an adjusting-arm with fork pivoted on said shaft at the sides of the two gears, a lever to set such adjusting-arm, and a casing with notches fitted to the lever as set forth, two intermediates meshing with such gears and pivoted upon the same end of the arm, side by side, eccentrically to one another upon the said forks, with their outer edges substantially coincident, to prevent interference of the shaft with either intermediate when each in turn is meshed with the gear projected slightly from the driven shaft.

In testimony whereof we have hereunto set our hands in the presence of two subscribing witnesses.

FRED L. EBERHARDT.
HENRY J. EBERHARDT.

Witnesses:
JOS. B. PIERSON,
THOMAS S. CRANE.